12) United States Patent
Li et al.

(10) Patent No.: US 12,009,924 B2
(45) Date of Patent: Jun. 11, 2024

(54) LINK QUALITY FEEDBACK FOR DIVERSITY ENHANCEMENT BASED NON-COHERENT JOINT TRANSMISSION

(71) Applicant: QUALCOMM Incorporated, San Diego, CA (US)

(72) Inventors: Qiaoyu Li, Beijing (CN); Chao Wei, Beijing (CN); Yu Zhang, Beijing (CN); Chenxi Hao, Beijing (CN); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/268,867

(22) PCT Filed: Aug. 5, 2019

(86) PCT No.: PCT/CN2019/099223
§ 371 (c)(1),
(2) Date: Feb. 16, 2021

(87) PCT Pub. No.: WO2020/038218
PCT Pub. Date: Feb. 27, 2020

(65) Prior Publication Data
US 2021/0306102 A1 Sep. 30, 2021

(51) Int. Cl.
H04L 1/16 (2023.01)
H04L 1/06 (2006.01)
(Continued)

(52) U.S. Cl.
CPC .............. H04L 1/1671 (2013.01); H04L 1/06 (2013.01); H04L 1/1819 (2013.01); H04L 1/1829 (2013.01); H04B 7/024 (2013.01)

(58) Field of Classification Search
None
See application file for complete search history.

(56) References Cited

U.S. PATENT DOCUMENTS

2009/0279460 A1* 11/2009 Sarkar ...................... H04L 1/18
370/280
2010/0272048 A1* 10/2010 Pan ...................... H04L 1/1812
370/329
(Continued)

FOREIGN PATENT DOCUMENTS

CN 102598758 A 7/2012
CN 103427960 A 12/2013
(Continued)

OTHER PUBLICATIONS

Ericsson, "On Multi-TRP and Multi-panel transmission", May 15-19, 2017, 3GPP TSG-RAN WG1 #89 R1-1708673, pp. 1-5 (Year: 2017).*
(Continued)

Primary Examiner — Steve R Young
(74) Attorney, Agent, or Firm — Harrity & Harrity, LLP

(57) ABSTRACT

Various aspects of the present disclosure generally relate to wireless communication. In some aspects, a user equipment may determine a first decoding result for a plurality of downlink control channels of a diversity enhancement based non-coherent joint transmission communication and a second decoding result for a plurality of data channels corresponding to the plurality of downlink control channels; and selectively provide feedback regarding the first decoding result and feedback regarding the second decoding result, the feedback regarding the first decoding result indicating whether reception of one or more downlink control channels, of the plurality of downlink control channels, is successful, and the feedback regarding the second decoding
(Continued)

result indicating whether decoding of a codeword of the plurality of data channels is successful. Numerous other aspects are provided.

30 Claims, 11 Drawing Sheets

(51) Int. Cl.
*H04L 1/1607* (2023.01)
*H04L 1/18* (2023.01)
*H04L 1/1812* (2023.01)
*H04L 1/1829* (2023.01)
*H04B 7/024* (2017.01)

(56) References Cited

U.S. PATENT DOCUMENTS

| | | | |
|---|---|---|---|
| 2013/0114575 A1* | 5/2013 | Fu | H04L 1/1692 370/336 |
| 2013/0215807 A1* | 8/2013 | Yang | H04L 5/0094 370/281 |
| 2013/0223253 A1 | 8/2013 | Enescu et al. | |
| 2013/0301450 A1 | 11/2013 | Geirhofer et al. | |
| 2017/0048861 A1* | 2/2017 | Choi | H04L 5/0053 |
| 2018/0041917 A1* | 2/2018 | Xi | H04W 72/121 |
| 2020/0221487 A1* | 7/2020 | Lee | H04L 5/0044 |

FOREIGN PATENT DOCUMENTS

| | | |
|---|---|---|
| CN | 107852259 A | 3/2018 |
| CN | 107872303 A | 4/2018 |

OTHER PUBLICATIONS

Ericsson: "On Multi-TRP and Multi-Panel Transmission," 3GPP Draft, 3GPP TSG-RAN WG1 #89, R1-1708673, 3rd Generation Partnership Project (3GPP), Mobile Competence Centre, 650, Route Des Lucioles, F-06921 Sophia-Antipolis Cedex, France, vol. RAN WG1, No. Hanzhou, China, May 15, 2017-May 19, 2017, May 14, 2017, XP051273856, 5 Pages, Retrieved from the Internet: URL: http://www.3gpp.org/ftp/Meetings_3GPP_SYNC/RAN1/Docs/ [retrieved on May 14, 2017] Section 1 Section 2.2 Section 3.1.
Supplementary European Search Report—EP19851260—Search Authority—Munich—dated Apr. 21, 2022.
Huawei et al., "Discussion on multi-TRP/panel transmission for reliability and robustness in NR", R1-1809118, 3GPP TSG RAN WG1 Meeting #94, Gothenburg, Sweden, Aug. 20-24, 2018, Aug. 11, 2018, 5 Pages.
International Search Report and Written Opinion—PCT/CN2018/101208—ISA/EPO—dated Apr. 28, 2019.
International Search Report and Written Opinion—PCT/CN2019/099223—ISA/EPO—dated Sep. 27, 2019.
Renesas Mobile Europe Ltd: "On the Feedback Options for Multipoint Transmission", R1-113891, 3GPP TSG-RAN WG1 Meeting #67, Nov. 18, 2011, 5 pages.

* cited by examiner

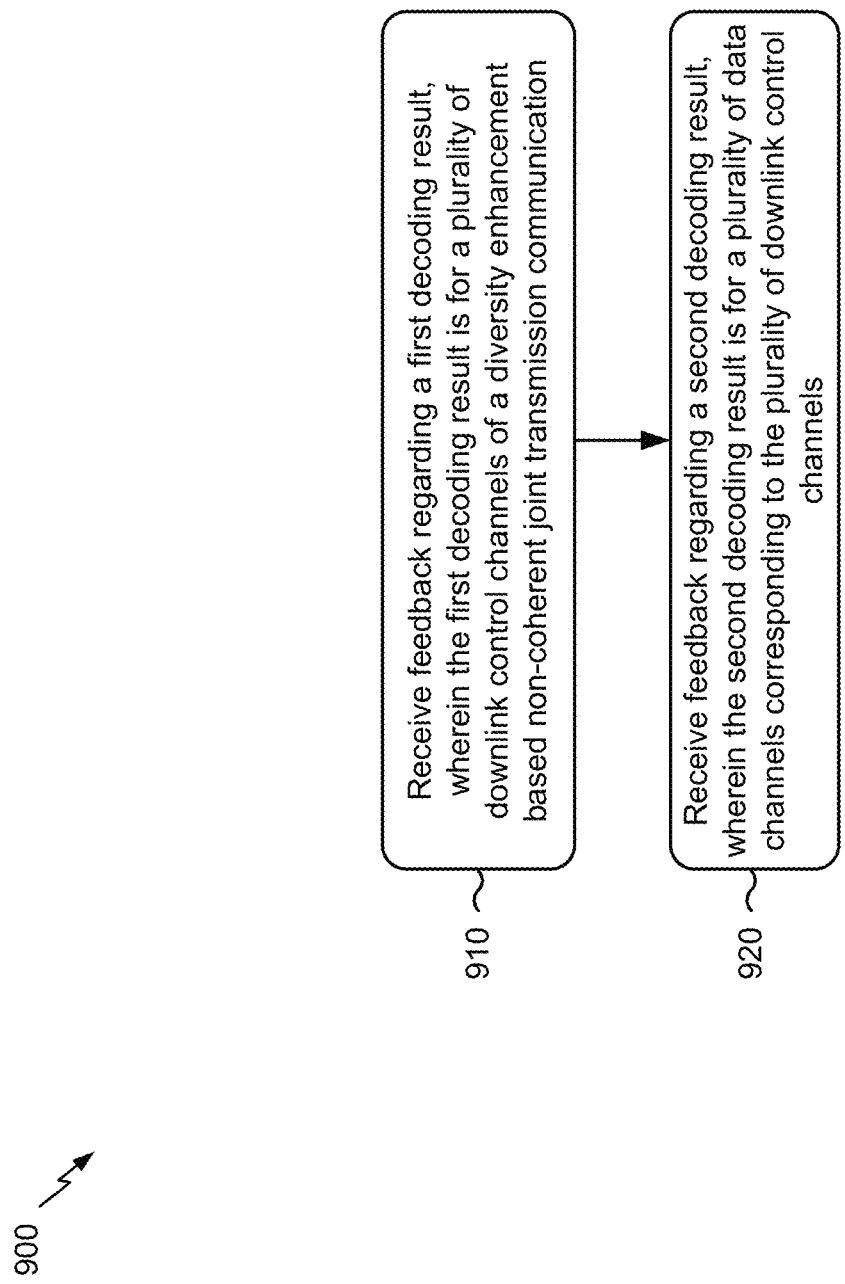

LINK QUALITY FEEDBACK FOR DIVERSITY ENHANCEMENT BASED NON-COHERENT JOINT TRANSMISSION

CROSS-REFERENCE TO RELATED APPLICATIONS

This application is a 371 national stage of PCT Application No. PCT/CN2019/099223 filed on Aug. 5, 2019, entitled "LINK QUALITY FEEDBACK FOR DIVERSITY ENHANCEMENT BASED NON-COHERENT JOINT TRANSMISSION," which claims priority to PCT Application No. PCT/CN2018/101208, filed on Aug. 18, 2018, entitled "LINK QUALITY FEEDBACK FOR DIVERSITY ENHANCEMENT BASED NON-COHERENT JOINT TRANSMISSION," which are hereby expressly incorporated by reference herein.

FIELD OF THE DISCLOSURE

Aspects of the present disclosure generally relate to wireless communication, and to techniques and apparatuses for link quality feedback for diversity enhancement based non-coherent joint transmission (NC-JT).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include determining a first decoding result for a plurality of downlink control channels of a diversity enhancement based non-coherent joint transmission communication and a second decoding result for a plurality of data channels corresponding to the plurality of downlink control channels; and selectively providing feedback regarding the first decoding result and feedback regarding the second decoding result, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, a user equipment for wireless communication may include memory and one or more processors operatively coupled to the memory. The memory and the one or more processors may be configured to determine a first decoding result for a plurality of downlink control channels of a diversity enhancement based non-coherent joint transmission communication and a second decoding result for a plurality of data channels corresponding to the plurality of downlink control channels; and selectively provide feedback regarding the first decoding result and feedback regarding the second decoding result, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, a non-transitory computer-readable medium may store one or more instructions for wireless communication. The one or more instructions, when executed by one or more processors of a user equipment, may cause the one or more processors to determine a first decoding result for a plurality of downlink control channels of a diversity enhancement based non-coherent joint transmission communication and a second decoding result for a plurality of data channels corresponding to the plurality of downlink control channels; and selectively provide feedback regarding the first decoding result and feedback regarding the second decoding result, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, an apparatus for wireless communication may include means for determining a first decoding result for a plurality of downlink control channels of a diversity enhancement based non-coherent joint transmission communication and a second decoding result for a plurality of data channels corresponding to the plurality of downlink control channels; and means for selectively providing feedback regarding the first decoding result and feedback regarding the second decoding result, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, a method of wireless communication, performed by a network entity, may include receiving feedback regarding a first decoding result, wherein the first decoding result is for a plurality of downlink control channels of a diversity enhancement based non-coherent joint transmission communication; and receiving feedback regarding a second decoding result, wherein the second decoding result is for a plurality of data channels corresponding to the plurality of downlink control channels, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, a network entity for wireless communication may include memory and one or more processors operatively coupled to the memory. The memory and the one or more processors may be configured to receive feedback regarding a first decoding result, wherein the first decoding result is for a plurality of downlink control channels of a diversity enhancement based non-coherent joint transmission communication; and receive feedback regarding a second decoding result, wherein the second decoding result is for a plurality of data channels corresponding to the plurality of downlink control channels, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, a non-transitory computer-readable medium may store one or more instructions for wireless communication. The one or more instructions, when executed by one or more processors of a network entity, may cause the one or more processors to receive feedback regarding a first decoding result, wherein the first decoding result is for a plurality of downlink control channels of a diversity enhancement based non-coherent joint transmission communication; and receive feedback regarding a second decoding result, wherein the second decoding result is for a plurality of data channels corresponding to the plurality of downlink control channels, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

In some aspects, an apparatus for wireless communication may include means for receiving feedback regarding a first decoding result, wherein the first decoding result is for a plurality of downlink control channels of a diversity enhancement based non-coherent joint transmission communication; and means for receiving feedback regarding a second decoding result, wherein the second decoding result is for a plurality of data channels corresponding to the plurality of downlink control channels, the feedback regarding the first decoding result or the feedback regarding the second decoding result being associated with one or more particular transmission/reception points, and the one or more downlink control channels corresponding to the one or more particular transmission/reception points, and the feedback regarding the first decoding result indicates whether reception of one or more downlink control channels, of the plurality of downlink control channels, is successful, and the feedback regarding the second decoding result indicating whether decoding of a codeword of the plurality of data channels is successful.

Aspects generally include a method, apparatus, system, computer program product, non-transitory computer-readable medium, user equipment, base station, wireless communication device, network entity, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a network entity, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
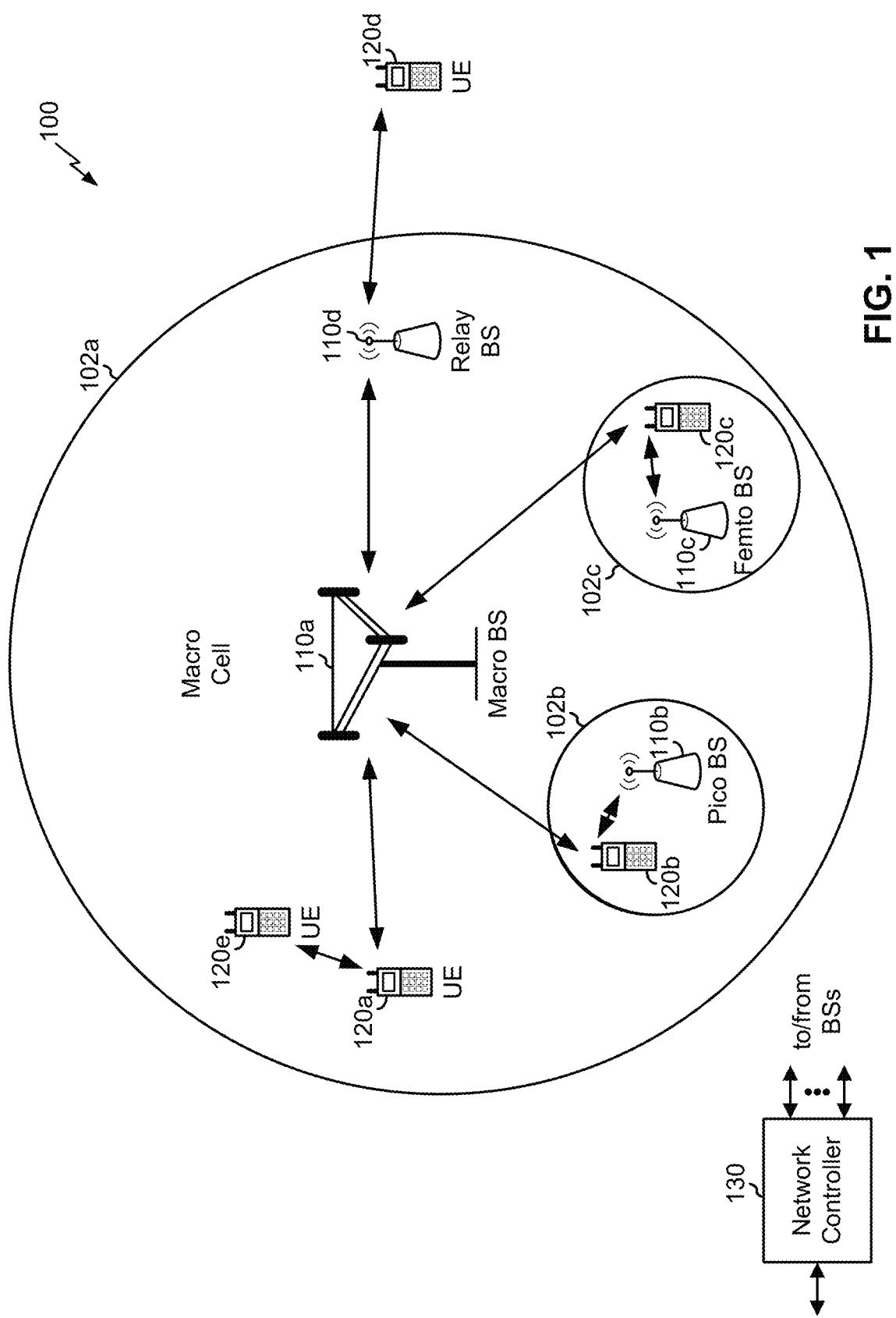
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
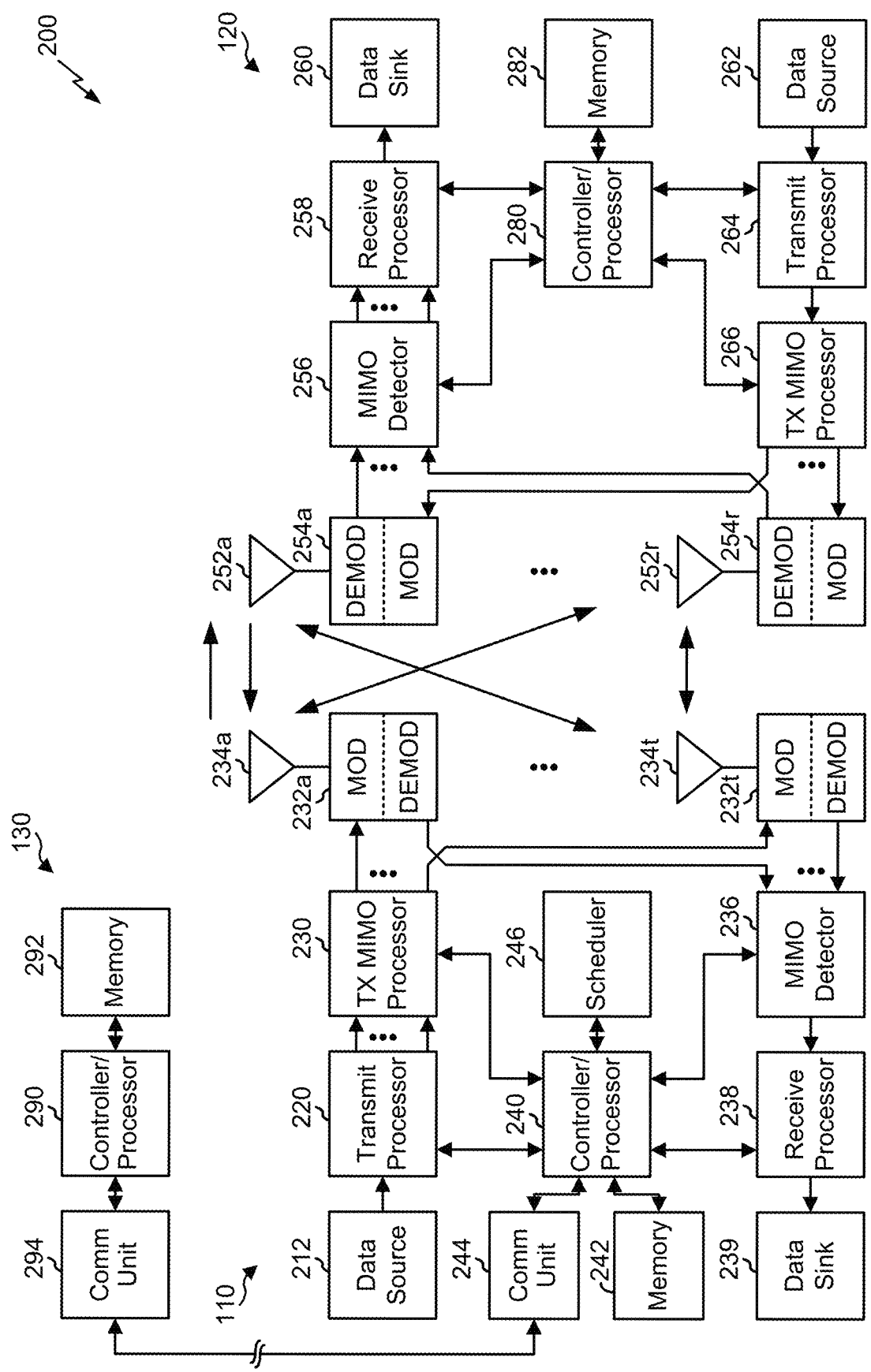
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with link quality feedback for diversity enhancement based NC-JT, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a first decoding result for a plurality of downlink control channels of a diversity enhancement based non-coherent joint transmission communication and a second decoding result for a plurality of data channels corresponding to the plurality of downlink control channels; means for selectively providing feedback regarding the first decoding result and feedback regarding the second decoding result; means for decoding the common codeword based at least on one or more of the respective signals received from the plurality of data channels; and/or the like. In some aspects, such means may include one or more components of UE 120 described in connection with FIG. 2.

In some aspects, a network entity (e.g., BS 110, NG-CN 504 described below, ANC 502 described below, a CN described below, a gNB, and/or the like) may include means for receiving feedback regarding a first decoding result, wherein the first decoding result is for a plurality of downlink control channels of a diversity enhancement based non-coherent joint transmission communication; means for receiving feedback regarding a second decoding result, wherein the second decoding result is for a plurality of data channels corresponding to the plurality of downlink control channels; and/or the like. In some aspects, such means may include one or more components of BS 110 or network controller 130 described in connection with FIG. 2.

As indicated above, FIG. 2 is provided merely as an example. Other examples may differ from what is described with regard to FIG. 2.

Figure 3A:
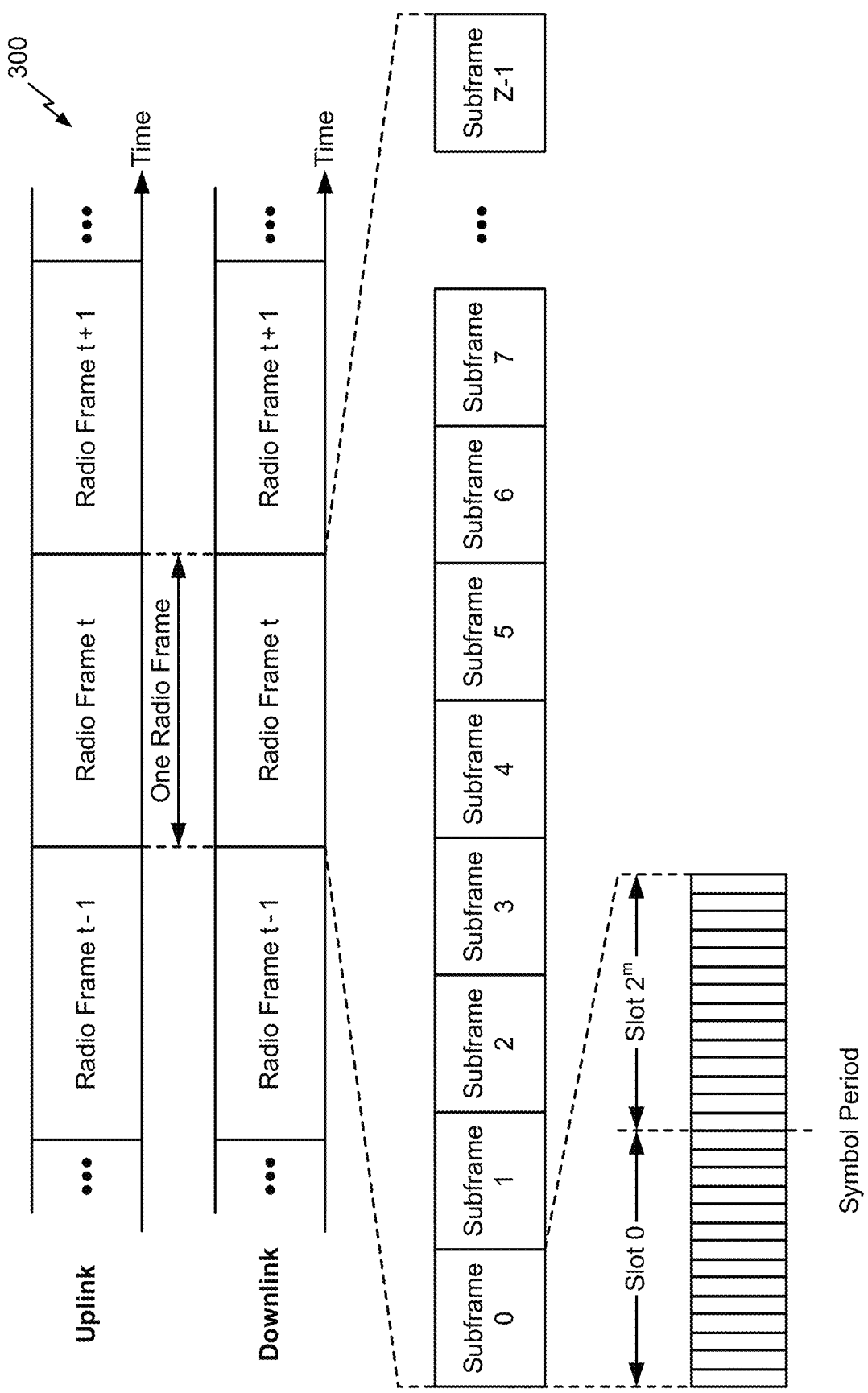
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
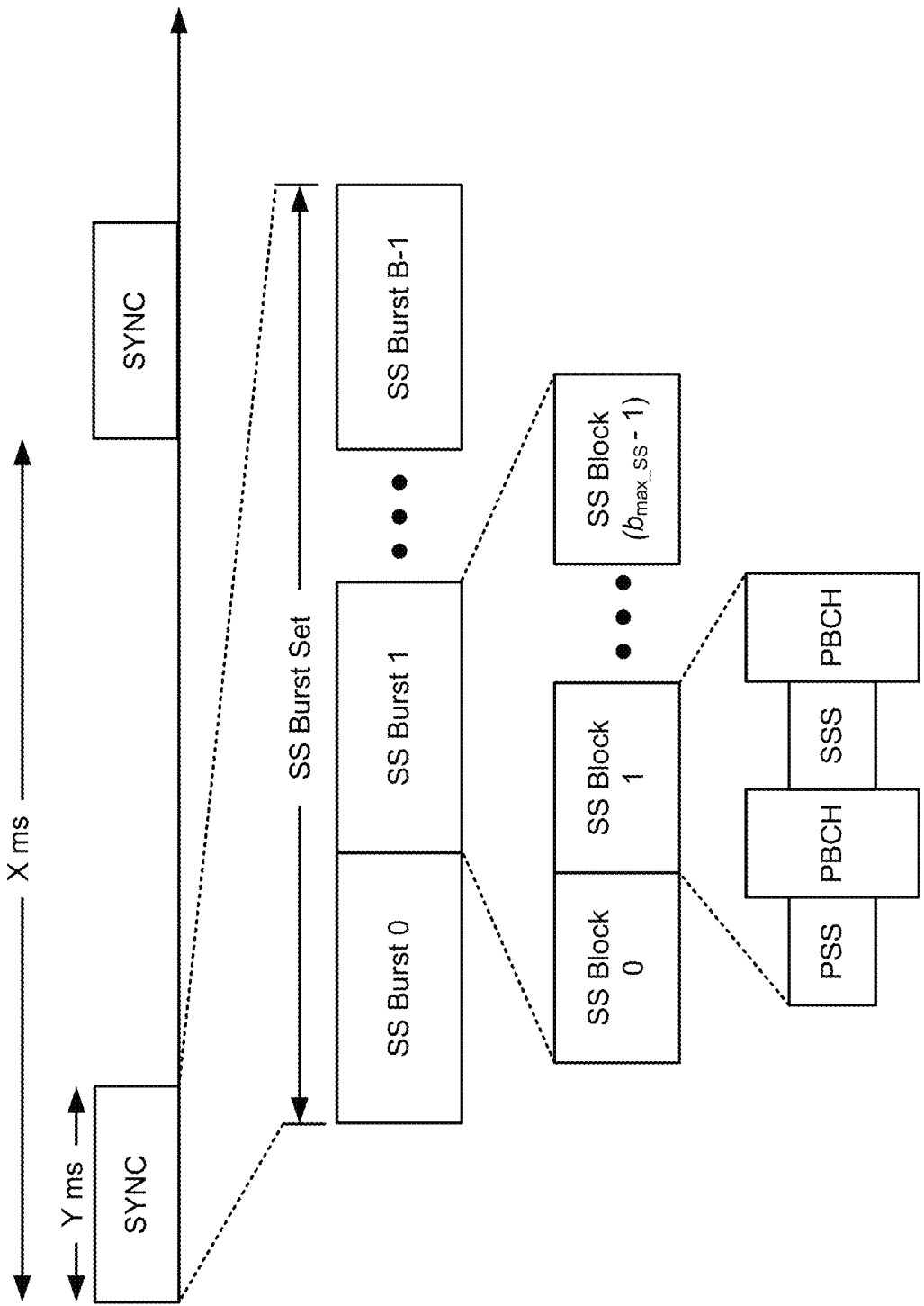
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
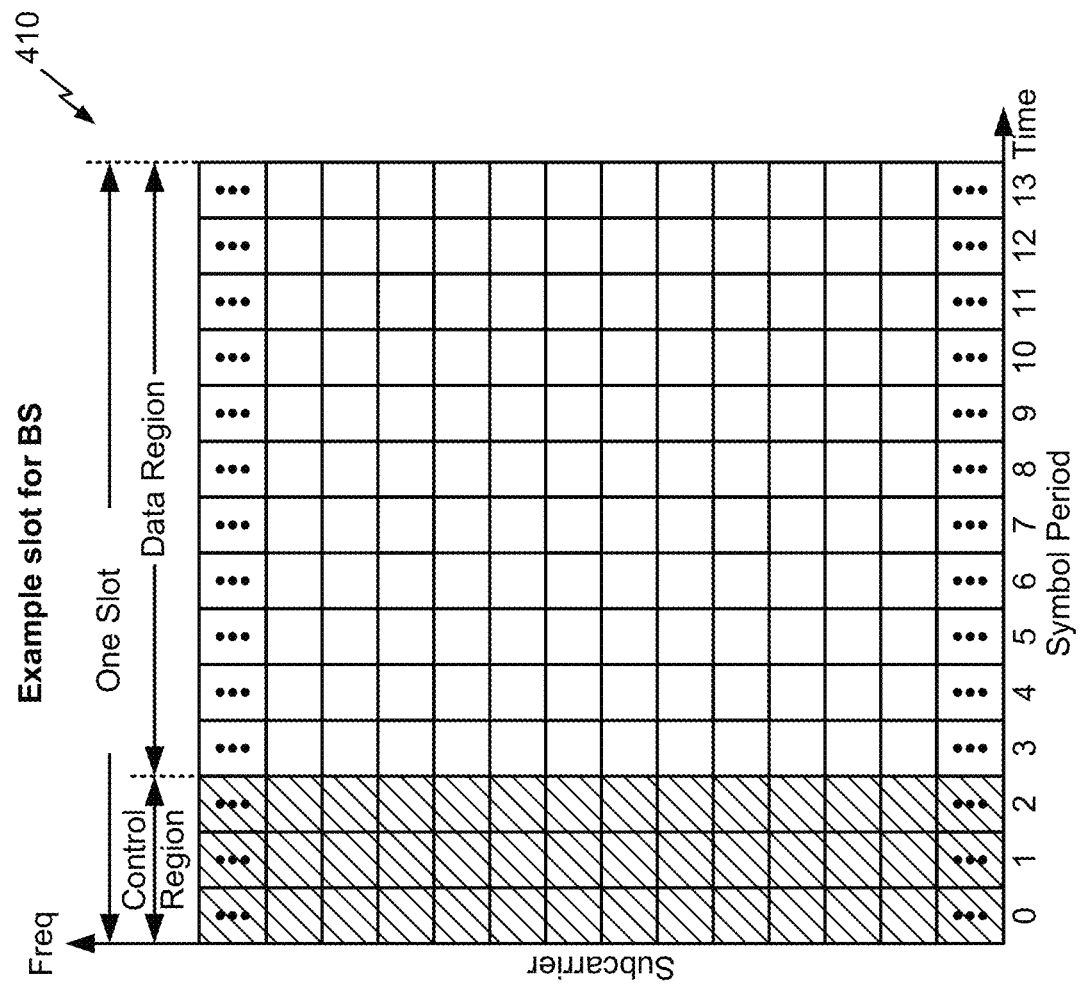
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

As indicated above, FIG. 4 is provided as an example. Other examples may differ from what is described with regard to FIG. 4.

Figure 5:
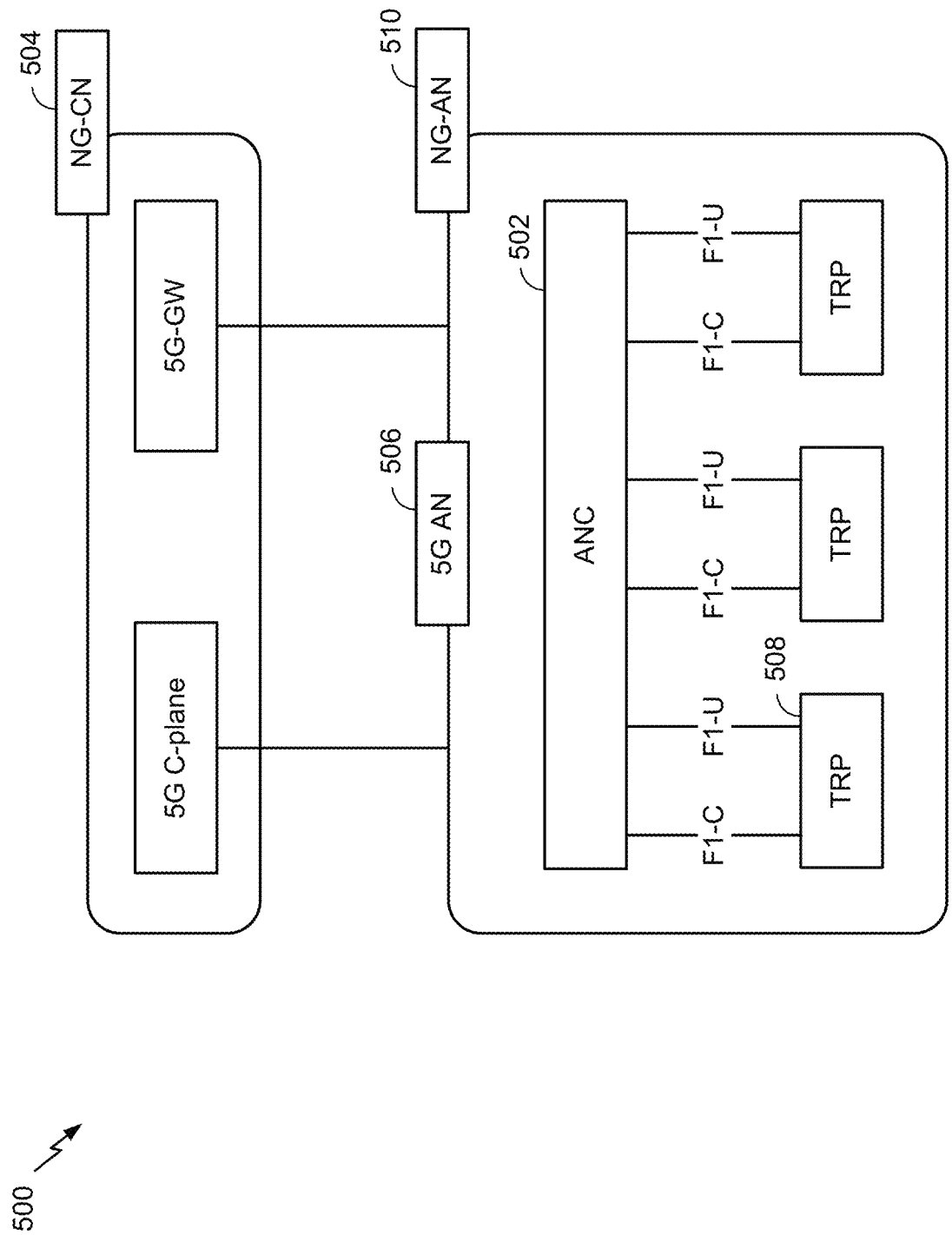
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
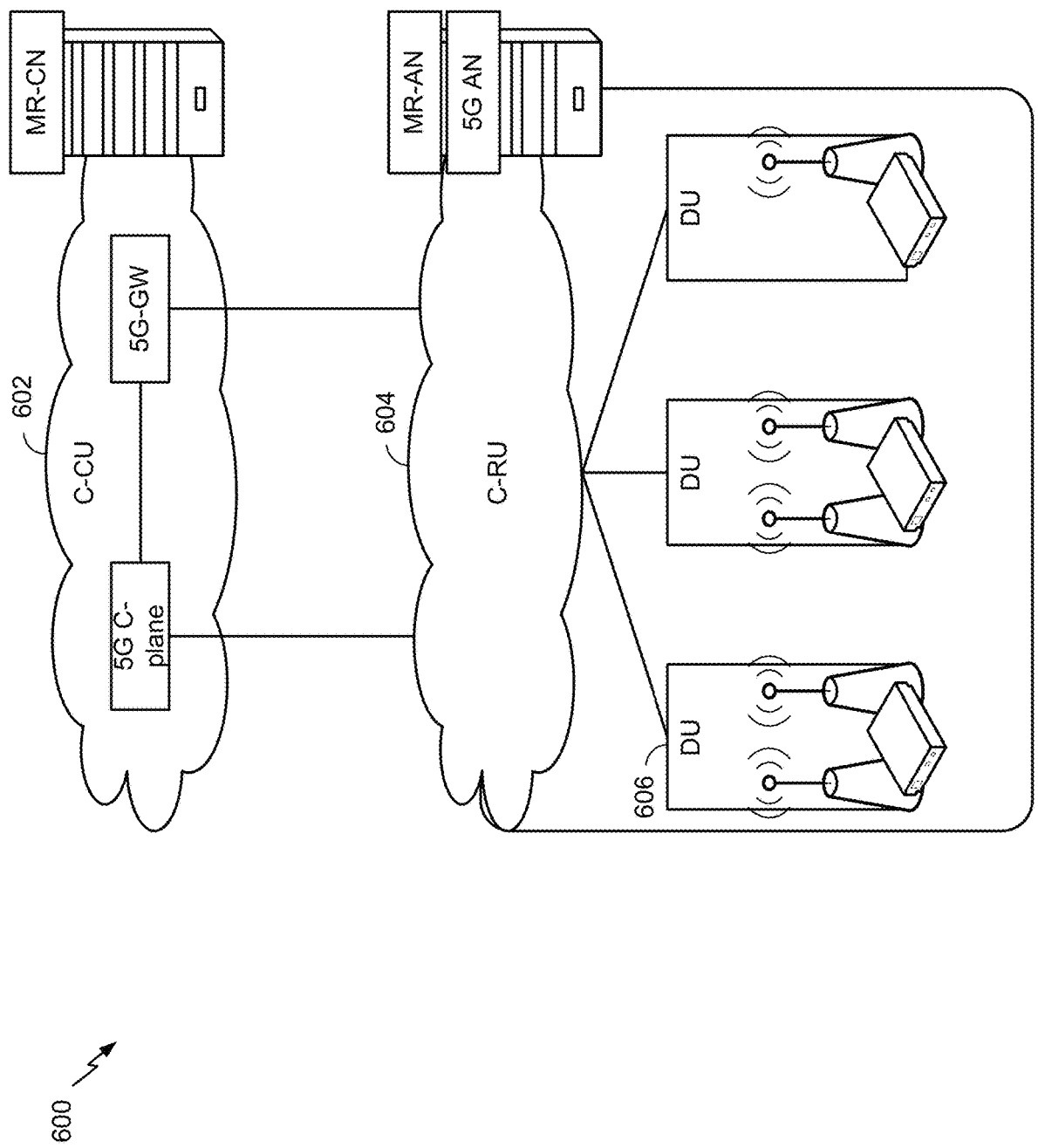
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Diversity enhancement based non-coherent joint transmission (NC-JT) is a transmission scheme wherein multiple transmission-reception points (TRPs) (e.g., TRP 508) and/or multiple antenna panels of a single TRP transmit the same codeword to the UE in a redundant manner without joint synchronization between TRPs. Diversity enhancement based NC-JT may improve spatial diversity. In diversity enhancement based NC-JT, each TRP may provide a respective physical downlink control channel (PDCCH) and physical downlink shared channel (PDSCH) for the transmission. The UE may receive a respective PDCCH from each TRP and may identify corresponding PDSCHs using the PDCCHs. The UE may receive the respective PDSCHs, and may combine the respective PDSCHs and decode the diversity enhancement based NC-JT communication. The UE may provide an acknowledgment (ACK) when the diversity enhancement based NC-JT is successfully received based at least in part on combining and decoding the respective PDSCHs, and may provide a negative ACK (NACK) otherwise. The ACK and NACK described above may be a hybrid automatic repeat request (HARQ) ACK/NACK, or a similar ACK/NACK.

In some cases, degraded link quality for one or more TRPs may lead to unsuccessful reception of a PDCCH and/or a PDSCH. For example, if the UE cannot decode the PDCCH for a TRP, then the UE may not be able to identify the corresponding PDSCH for the TRP. In such a case, reception of the corresponding PDSCH may fail. The UE may use the remaining PDSCHs of the diversity enhancement based NC-JT communication to decode the diversity enhancement based NC-JT communication. This may or may not be successful.

When decoding of the remaining PDSCHs is successful, and if the UE accordingly provides an ACK, then the network may determine that the TRPs of the diversity enhancement based NC-JT communication are associated with similar link quality. Therefore, the network may schedule further transmission for the same TRPs, and may use a similar or higher (e.g., more complex) order of modulation and coding scheme (MCS). This may lead to unsuccessful reception of subsequent diversity enhancement based NC-JT communications. In such cases, the HARQ ACK/NACK process may be inefficient and wasteful of resources.

Some techniques and apparatuses described herein provide feedback regarding the PDCCH for a TRP and the PDSCH for a TRP associated with a diversity enhancement based NC-JT communication. For example, some techniques and apparatuses described herein provide feedback for PDCCHs and for PDSCHs corresponding to respective TRPs, which enables more efficient allocation of resources for subsequent diversity enhancement based NC-JT transmissions in accordance with TRP-specific link qualities. In some aspects, the feedback may be provided in uplink control information (UCI). When UCI payload size is limited, the feedback may prioritize cases wherein decoding of the PDSCH is correct and one or more PDCCHs were unsuccessfully received. In such a case, the network may schedule subsequent diversity enhancement based NC-JT communications (or other communications) using the TRPs that have successful PDCCH reception. Thus, radio resources may be more efficiently allocated.

Figure 7A:
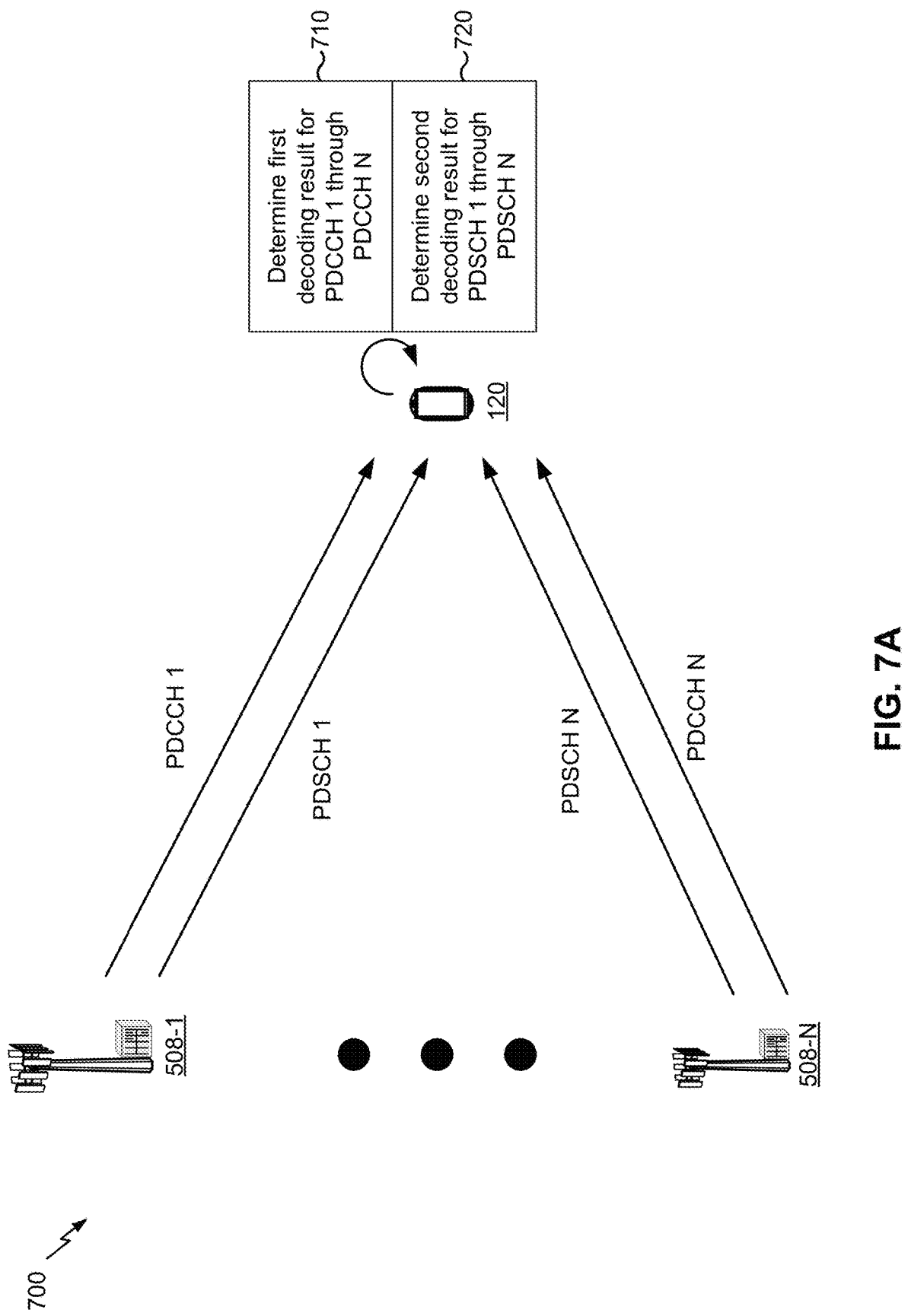
FIGS. 7A and 7B are diagrams illustrating examples of link quality feedback for a diversity enhancement based NC-JT communication, in accordance with various aspects of the present disclosure.
Figure 7B:
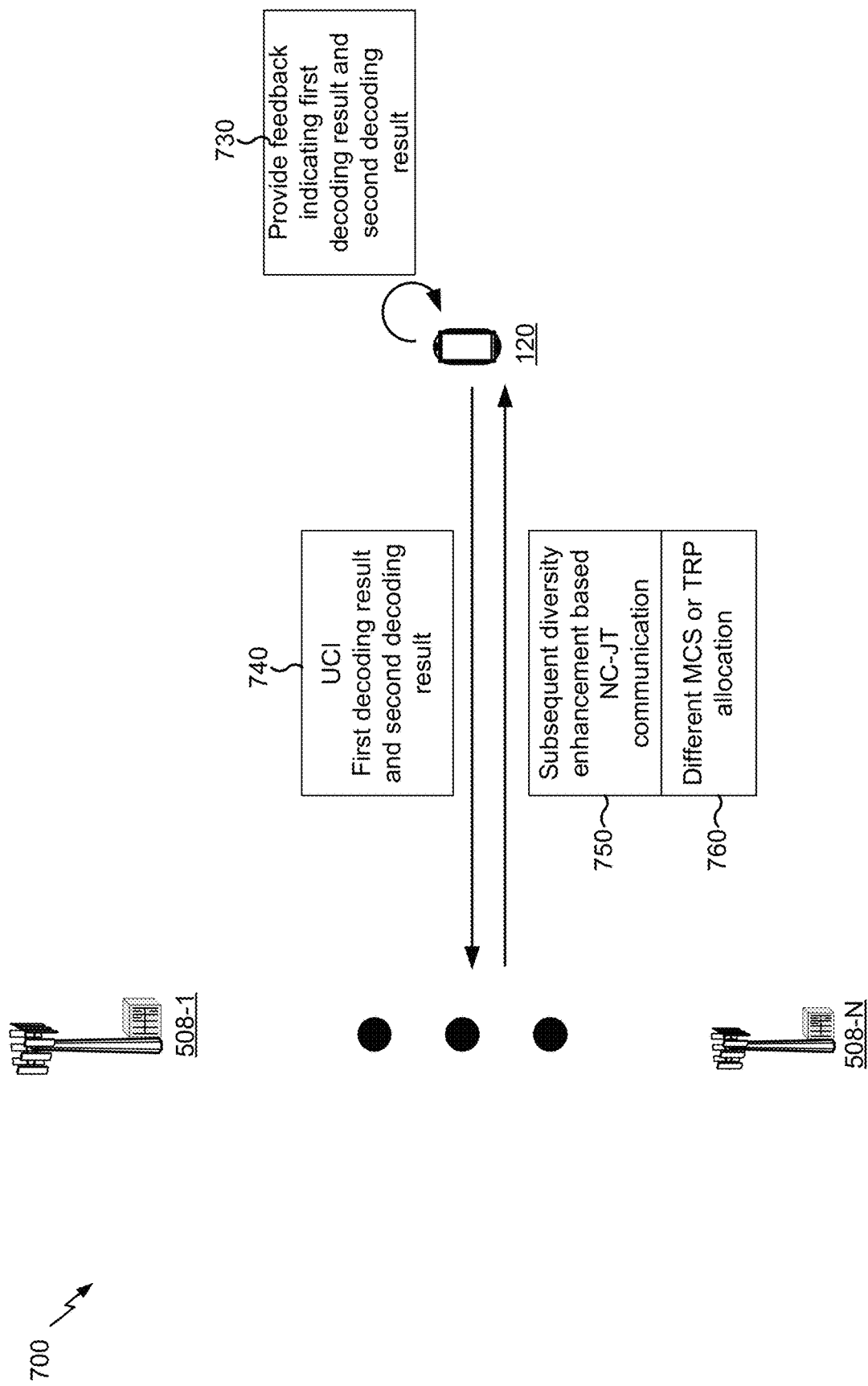

FIGS. 7A and 7B are diagrams illustrating examples 700 of link quality feedback for a diversity enhancement based NC-JT communication, in accordance with various aspects of the present disclosure. As shown, example 700 includes a set of TRPs 508-1 through 508-N. N may be any integer greater than 1 (e.g., 2, 3, and/or the like). The set of TRPs 508 may be associated with a network (e.g., BS 110, NG-CN 504, ANC 502, a CN, and/or the like). The network may perform scheduling, resource allocation, and/or the like for the set of TRPs 508. For example, the network may select TRPs 508 for communication with the UE 120, may determine communication parameters (e.g., MCS, transmit power, and/or the like) for the TRPs 508 based at least in part on link quality feedback, and/or the like. NC-JT operations described as being performed by different TRPs may be performed by different TRPs, different antenna panels of a TRP, different antenna panels of different TRPs, or a combination thereof. In some aspects, a TRP may be associated with or identified by a demodulation reference signal (DMRS) group. For example, each TRP may be associated with or identified by a respective DMRS group. Thus, a reference to a TRP or information identifying a TRP may be understood to refer to a DMRS group or information identifying a DMRS group.

The set of TRPs 508 may transmit a diversity enhancement based NC-JT communication to a UE 120. The diversity enhancement based NC-JT communication may include respective PDCCHs 1 through N and respective PDSCHs 1 through N. For example, each TRP 508 of the set of TRPs 508 may transmit a respective PDCCH and a respective PDSCH to the UE 120. Each PDCCH may identify a resource allocation for the corresponding PDSCH. The UE 120 may receive and decode the corresponding PDSCH codeword based at least in part on each PDSCH. In some aspects, the respective PDSCHs may include different codewords. For example, each PDSCH may include a respective part of a communication to be formed by separately decoding the codewords at the UE 120. In some aspects, the respective PDSCHs may include redundant codewords. For example, the same or different redundant versions of a single codeword may be provided on PDSCHs 1 through N to improve a likelihood of successful decoding (e.g., using soft combining and/or like) at the UE 120.

As shown by reference number 710, the UE 120 may determine a first decoding result for the PDCCHs 1 through N. For example, the UE 120 may determine whether each PDCCH, of the PDCCHs 1 through N, is successfully decoded. When the UE 120 unsuccessfully decodes a PDCCH (e.g., fails to decode a PDCCH), the UE 120 may not identify the resources or configuration associated with the corresponding PDSCH, so reception or decoding of the corresponding PDSCH may fail. In some aspects, unsuccessful reception of a PDCCH may be referred to herein as discontinuous transmission (DTX) by or associated with a TRP 508 that transmits the PDCCH.

As shown by reference number 720, the UE 120 may determine a second decoding result for the PDSCHs 1 through N. For example, the UE 120 may determine whether a codeword of PDSCHs 1 through N is successfully decoded. As another example, the UE 120 may determine whether the diversity enhancement based NC-JT communication is successfully decoded. In some cases, the UE 120 may receive all PDSCHs and may successfully decode the codeword using all PDSCHs. In some cases, the UE 120 may successfully decode the codeword using a subset of PDSCHs 1 through N. For example, the UE 120 may not receive one or more PDSCHs (e.g., based at least in part on unsuccessful PDCCH reception, channel conditions, and/or the like), and may still be successful in decoding the codeword using the remaining PDSCHs, or fail to decode the codeword using the remaining PDSCHs.

In some aspects, respective signals may be received in each PDSCH of the PDSCHs 1 through N. The respective signals may be generated from a redundant version of a common codeword for the UE 120. The UE 120 may decode the common codeword based at least in part on one or more of the respective signals received from the PDSCHs 1 through N.

If the UE 120 were to provide ACK/NACK feedback only for the diversity enhancement based NC-JT communication (e.g., the PDSCHs) without indicating whether reception of the corresponding PDCCHs is successful, the network associated with TRPs 508 may not know individual channel quality of the TRPs 508. In such a case, the network may continue to use an at-least-partially unsuccessful configuration for diversity enhancement based NC-JT communication with the UE 120. As described, below, the UE 120 may provide feedback regarding the first decoding result (e.g., for the PDCCHs) and the second decoding result (e.g., for the PDSCHs), which enables more efficient network resource allocation by the network.

As shown in FIG. 7B, and by reference number 730, the UE 120 may provide feedback indicating the first decoding result and the second decoding result. For example, the UE 120 may provide information, to the TRPs 508 and/or the network associated with the TRPs 508 (e.g., via one or more of the TRPs 508), that identifies the first decoding result and the second decoding result. The feedback indicating the first decoding result may identify decoding results for one or more PDCCHs and/or the TRPs 508 associated with the one or more PDCCHs (e.g., DMRS groups associated with the TRPs 508 and/or the like). The feedback indicating the second decoding result may indicate whether decoding of the PDSCHs (e.g., the diversity enhancement based NC-JT communication) is successful, and/or may identify particular TRPs 508 associated with successful or unsuccessful decoding of the PDSCHs. In some aspects, when the allowable payload size for the feedback is limited, the feedback may prioritize identification of successful or unsuccessful reception of PDCCHs and the TRPs 508 associated with the successful or unsuccessful reception, as described in more detail in connection with reference number 740. For example, the feedback may prioritize identification of successful decoding of a codeword (e.g., based at least in part on an ACK) and unsuccessful decoding of a PDCCH of the diversity enhancement based NC-JT communication. Thus, the feedback may enable more efficient allocation of resources than if an ACK were provided without identifying the unsuccessful decoding of the PDCCH.

As shown by reference number 740, the UE 120 may provide the feedback indicating the first decoding result and the feedback indicating the second decoding result using uplink control information (UCI). In some aspects, the UE 120 may use a particular format for the feedback. In some aspects, the format may be based at least in part on whether the diversity enhancement based NC-JT communication is received from 2 TRPs 508, 3 TRPs 508, or a greater number of TRPs 508. Additionally, or alternatively, the format may be based at least in part on a physical uplink control channel (PUCCH) format to be used for the UCI. In some aspects, the format may be based at least in part on whether 2-bit feedback within a PUCCH resource, 3-bit feedback within a PUCCH resource, 4-bit feedback within a PUCCH resource, 5-bit feedback within a PUCCH resource, or another size of feedback is to be used. Additionally, or alternatively, the format may be based at least in part on the number of PUCCH resources to be used to provide the feedback.

Examples of the formats and particular values, for 2 TRPs, 3 TRPs, different bit sizes of feedback, different numbers of PUCCH resources, and different PUCCH formats, are provided below. It should be understood that the below values are provided as examples. The particular mappings of bit codes to feedback information may vary in implementation and are not limited to those disclosed below. Similarly, in the examples below that use a single PUCCH resource, example values of feedback are not provided. Furthermore, any of the feedback described below can be provided using a PUCCH repetition scheme, which improves reliability of the feedback.

In the below examples, an ACK indicates successful decoding of a codeword using successfully received physical downlink shared channels (PDSCHs), and a NACK indicates unsuccessful decoding of a codeword (e.g., based at least in part on received PDSCHs or non-received PDSCHs associated with an unsuccessful PDCCH). Single-DTX may indicate that a single PDCCH of a diversity enhancement based NC-JT communication is not successfully decoded. Double-DTX may indicate that two PDCCHs of a diversity enhancement based NC-JT communication are not successfully decoded.

In some aspects, the UE 120 may provide 2-bit feedback in a single PUCCH resource for 2 TRPs, denoted below as TRP-#0 and TRP-#1. In such a case, the UE 120 may use PUCCH format 0 or 1 in accordance with a format referred to herein as Option 1A. The PUCCH formats are described in more detail elsewhere herein. In this case, a first value may indicate an ACK, which may indicate that decoding of the codeword is correct (e.g., that the second decoding result is successful). The first value may indicate that the reception or decoding of all PDCCHs are successful (e.g., that the first decoding result is successful), and the decoding of the codeword is also correct, or may indicate that the reception of one of the PDCCHs is unsuccessful (e.g., that the first decoding result is partially successful without indicating the unsuccessful TRP 508), and the decoding of the code is correct based on the other successfully received PDSCH. In other words, a single value of the feedback may indicate two states of the first decoding result and the second decoding result. A second value may indicate a NACK, which may indicate that the reception or decoding of all PDCCHs (e.g., the first decoding result) is successful, and the decoding of the codeword is incorrect (e.g., that the second decoding result is unsuccessful). A third value may indicate Single-DTX for a particular TRP-#0 (denoted hereinafter as Single-DTX-TRP-#0. For example, the third value may indicate that the reception of the PDCCH with regard to a TRP-#0 is unsuccessful, and that the decoding of the codeword (e.g., the second decoding result) is incorrect despite the other successfully-received PDSCH associated with TRP-#1. A fourth value may indicate Single-DTX-#1, indicating that the reception or decoding of the PDCCH associated with TRP-#1 is unsuccessful, and the decoding of the codeword (e.g., the second decoding result) is incorrect despite the other successfully-received PDSCH from TRP-#0. A fifth value may indicate Double-DTX (e.g., no transmission of the UCI), which may indicate that the reception of all PDCCHs are unsuccessful. In other words, the UE 120 may not provide the UCI for the fifth value, which may indicate that the first decoding result was entirely unsuccessful.

In some aspects, the UE 120 may provide 2-bit feedback in a single PUCCH resource for 2 TRPs, denoted below as TRP-#0 and TRP-#1. In such a case, the UE 120 may use PUCCH format 0 or 1 in accordance with a format referred to herein as Option 1B. A first value may indicate an ACK, which may indicate that decoding of the codeword is correct and the reception of all PDCCHs is successful. A second value may indicate a NACK without DTX, indicating that the reception of all PDCCHs is successful, and the decoding of the codeword is incorrect. A third value may indicate an ACK with Single-DTX, which may indicate that the reception of one of the PDCCHs is unsuccessful (without identifying which PDCCH or which TRP 508 was unsuccessfully decoded), and the decoding of the codeword is correct using the other successfully-received PDSCH. A fourth value may indicate a NACK with Single-DTX, which may indicate that the reception of the PDCCH with regard to one TRP is unsuccessful (without identifying the particular TRP), and the decoding of the codeword is unsuccessful. A fifth value or a non-transmission may indicate Double-DTX, which may indicate that the reception of all PDCCHs is unsuccessful.

In some aspects, the UE 120 may provide 2-bit feedback in a single PUCCH resource for 2 TRPs, denoted below as TRP-#0 and TRP-#1. In such a case, the UE 120 may use PUCCH format 0 or 1 in accordance with a format referred to herein as Option 1C. A first value may indicate an ACK, which may indicate that decoding of the codeword is correct and the reception of all PDCCHs is successful. A second value may indicate a NACK without DTX or with single-DTX. In a first state for the second value, the reception of all PDCCHs is successful, and the decoding of the codeword is unsuccessful. In a second state for the second value, the reception of one of the PDCCH is unsuccessful, and the decoding of the codeword is incorrect despite the other successfully-received PDSCH. A third value may indicate an ACK with Single-DTX-#0, which may indicate that the reception of the PDCCH with regard to TRP-#0 is unsuccessful, and the decoding of the codeword is successful using the successfully-received PDSCH associated with TRP-#1. A fourth value may indicate an ACK with Single-DTX-#1, and may indicate that the reception of the PDCCH with regard to TRP-#1 is unsuccessful, and the decoding of the codeword is correct using the successfully-received PDSCH associated with TRP-#0. A fifth value or no transmission may indicate Double-DTX, indicating that the reception of all PDCCHs are unsuccessful.

Option 1C may provide for an efficient allocation of network resources. For example, the network, upon receiving an ACK with Single-DTX-#0 or an ACK with Single-DTX-#1 as defined in Option 1C, may determine to use the TRP with the successful PDSCH reception and may use an MCS that was previously used for the TRP with the successful PDSCH reception. If a NACK with a Single-DTX occurs using Option 1C, the network may not be able to differentiate the NACK with Single-DTX from the NACK without DTX (e.g., based at least in part on the formats provided in Option 1C). In that case, the network may lower the MCS of both TRPs for retransmissions of the diversity enhancement based NC-JT communication, so that subsequent decoding may be successful.

In some aspects, the UE 120 may provide 3-bit feedback in a single PUCCH resource for 2 TRPs, denoted below as TRP-#0 and TRP-#1. In such a case, the UE 120 may use PUCCH format 2, 3, or 4 in accordance with a format referred to herein as Option 2. A first value may indicate an ACK without DTX, which may indicate that decoding of the codeword is successful, and the reception of all PDCCHs is successful. A second value may indicate a NACK without DTX, which may indicate that decoding of the codeword is unsuccessful and the reception of all PDCCHs is unsuccessful. A third value may indicate an ACK with Single-DTX-#0, which may indicate that decoding of the codeword is successful and the reception of the PDCCH associated with TRP-#0 is unsuccessful. For the third value, the decoding of the codeword may be correct based at least in part on the successfully-received PDSCH from TRP-#1. A fourth value may indicate an ACK w/Single-DTX-#1, which may indicate that decoding of the codeword is correct and where the reception of the PDCCH associated with TRP-#1 is unsuccessful. For the fourth value, the decoding of the codeword may be successful based at least in part on the successfully-received PDSCH associated with TRP-#0. A fifth value may indicate a NACK with a Single-DTX-#0, which may indicate that decoding of the codeword is unsuccessful and the reception of the PDCCH associated with TRP-#0 is unsuccessful. For the fifth value, the decoding of the codeword may be unsuccessful despite the successfully-received PDSCH from TRP-#1. A sixth value may indicate a NACK with a Single-DTX-#0, which may indicate that decoding of the codeword is incorrect and the reception of the PDCCH associated with TRP-#1 is unsuccessful. For the sixth value, the decoding of the codeword is unsuccessful despite the successfully-received PDSCH from TRP-#0. A seventh value or no transmission may indicate Double-DTX, which may indicate that the reception of all PDCCHs is unsuccessful.

In some aspects, the UE 120 may provide 2-bit feedback in two PUCCH resources for 2 TRPs, denoted below as TRP-#0 and TRP-#1. In such a case, the UE 120 may use PUCCH format 0 or 1 in accordance with a format referred to herein as Option 3. The description of Option 3 omits some of the long-form description that was used in connection with Options 1A, 1B, 1C, and 2 for brevity, but uses a similar notation to Options 1A, 1B, 1C, and 2 to describe the feedback information conveyed by various values. A first value may indicate an ACK without DTX (e.g., "11" transmitted on PUCCH resource 0). A second value may indicate a NACK without DTX (e.g., "00" transmitted on PUCCH resource 0). A third value may indicate an ACK with Single-DTX-#0 (e.g., "10" transmitted on PUCCH resource 0). A fourth value may indicate an ACK with Single-DTX-#1 (e.g., "01" transmitted on PUCCH resource 0). A fifth value may indicate a NACK with Single-DTX-#0 (e.g., "10" transmitted on PUCCH resource 1). A sixth value may indicate a NACK with Single-DTX-#0 (e.g., "01" transmitted on PUCCH resource 1). A seventh value or no transmission may indicate Double-DTX.

Various feedback formats for 3-TRP diversity enhancement based NC-JT communications are provided below. The notation used to describe the feedback formats is similar to that used for the 2-TRP diversity enhancement based NC-JT communications described above. More specifically, Single-DTX may indicate a failure to decode a PDCCH for a single TRP, Double-DTX may indicate a failure to decode a PDCCH for two TRPs, Triple-DTX may indicate a failure to decode a PDCCH for three TRPs, Partial-DTX may indicate a failure to decode one or more PDCCHs corresponding to one or more TRPs, ACK may indicate successful decoding of a codeword using the received PDSCHs, and NACK may indicate unsuccessful decoding of the codeword. The feedback formats described below are referred to as Options 4 through 9.

In some aspects, the UE 120 may provide 2-bit feedback in a single PUCCH resource for 3 TRPs. In such a case, the UE 120 may use PUCCH format 0 or 1 in accordance with a format referred to herein as Option 4. A first value may indicate an ACK. A second value may indicate a NACK without DTX or a NACK with Partial-DTX. For example, the second value may indicate that all PDCCHs were successfully decoded and the codeword was not successfully decoded, or may indicate that the decoding of one or two PDCCHs was unsuccessful and that the decoding of the codeword using the remaining PDSCHs was unsuccessful. A third value may indicate an ACK with Single-DTX. A fourth value may indicate an ACK with Double-DTX. A fifth value or no transmission may indicate Triple-DTX.

In some aspects, the UE 120 may provide 3-bit feedback in a single PUCCH resource for 3 TRPs. In such a case, the UE 120 may use PUCCH format 2, 3, or 4 in accordance with a format referred to herein as Option 5. A first value may indicate an ACK without DTX. A second value may indicate a NACK without DTX or a NACK with Single-DTX or Double-DTX. A third value may indicate an ACK with Single-DTX-#0. A fourth value may indicate an ACK with Single-DTX-#1. A fifth value may indicate an ACK with Single-DTX-#2. A sixth value may indicate an ACK with Double-DTX-#0 and #1. A seventh value may indicate an ACK with Double-DTX-#0 and #2. An eighth value may indicate an ACK with Double-DTX-#1 and #2. A ninth value may indicate Triple-DTX. As can be seen, the above formats emphasize the cases wherein decoding of the codeword is successful but at least partial DTX occurs. Furthermore, Option 5 may provide for efficient adjustment of TRP resources when Single-DTX or Double-DTX occurs, thereby improving network efficiency.

In some aspects, the UE 120 may provide 2-bit feedback in 2 PUCCH resources for 3 TRPs. In such a case, the UE 120 may use PUCCH format 0 or 1 in accordance with a format referred to herein as Option 6. A first value may indicate an ACK without DTX (e.g., 11 on PUCCH resource 1). A second value may indicate a NACK without DTX or a NACK with Single-DTX or Double-DTX (e.g., 00 on PUCCH resource 0). A third value may indicate an ACK with Single-DTX-#0 (e.g., 00 on PUCCH resource 1). A fourth value may indicate an ACK with Single-DTX-#1 (e.g., 01 on PUCCH resource 1). A fifth value may indicate an ACK with Single-DTX-#2 (e.g., 01 on PUCCH resource 1). A sixth value may indicate an ACK with Double-DTX-#0 and #1 (e.g., 01 on PUCCH resource 0). A seventh value may indicate an ACK with Double-DTX-#0 and #2 (e.g., 10 on PUCCH resource 0). An eighth value may indicate an ACK with Double-DTX-#1 and #2 (e.g., 11 on PUCCH resource 0). A ninth value may indicate Triple-DTX. Furthermore, Option 6 may provide for efficient identification of poor TRP links when Single-DTX or Double-DTX occurs, thereby improving network resource allocation.

In some aspects, the UE 120 may provide 4-bit feedback in a single PUCCH resource for 3 TRPs. In such a case, the UE 120 may use PUCCH format 2, 3, or 4 in accordance with a format referred to herein as Option 7. A first value may indicate ACK without DTX. A second value may indicate a NACK without DTX. A third value may indicate ACK with Single-DTX-#0. A fourth value may indicate ACK with Single-DTX-#1. A fifth value may indicate ACK with Single-DTX-#2. A sixth value may indicate ACK with Double-DTX-#0 and #1. A seventh value may indicate ACK with Double-DTX-#0 and #2. An eighth value may indicate ACK with Double-DTX-#1 and #2. A ninth value may indicate NACK with Single-DTX-#0. A tenth value may indicate NACK with Single-DTX-#1. A tenth value may indicate NACK with Single-DTX-#2. An eleventh value may indicate NACK with Double-DTX-#0 and #1. A twelfth value may indicate NACK with Double-DTX-#0 and #2. A thirteenth value may indicate NACK with Double-DTX-#1 and #2. A fourteenth value or no transmission may indicate Triple-DTX. As can be seen, the above formats emphasize the cases wherein decoding of the codeword is successful but at least partial DTX occurs. Furthermore, Option 7 may provide for efficient identification of poor TRP links when Single-DTX or Double-DTX occurs, thereby improving network resource allocation.

In some aspects, the UE 120 may provide 3-bit feedback in 2 PUCCH resources for 3 TRPs. In such a case, the UE 120 may use PUCCH format 2, 3, or 4 in accordance with a format referred to herein as Option 8. A first value may indicate ACK without DTX (e.g., 111 on PUCCH resource 1). A second value may indicate a NACK without DTX (e.g., 000 on PUCCH resource 0). A third value may indicate ACK with Single-DTX-#0 (e.g., 000 on PUCCH resource 1). A fourth value may indicate ACK with Single-DTX-#1 (e.g., 001 on PUCCH resource 1). A fifth value may indicate ACK with Single-DTX-#2 (e.g., 010 on PUCCH resource 1). A sixth value may indicate ACK with Double-DTX-#0 and #1 (e.g., 100 on PUCCH resource 1). A seventh value may indicate ACK with Double-DTX-#0 and #2 (e.g., 101 on PUCCH resource 1). An eighth value may indicate ACK with Double-DTX-#1 and #2 (e.g., 110 on PUCCH resource 1). A ninth value may indicate NACK with Single-DTX-#0 (e.g., 001 on PUCCH resource 0). A tenth value may indicate NACK with Single-DTX-#1 (e.g., 010 on PUCCH resource 0). A tenth value may indicate NACK with Single-DTX-#2 (e.g., 011 on PUCCH resource 0). An eleventh value may indicate NACK with Double-DTX-#0 and #1 (e.g., 100 on PUCCH resource 0). A twelfth value may indicate NACK with Double-DTX-#0 and #2 (e.g., 101 on PUCCH resource 0). A thirteenth value may indicate NACK with Double-DTX-#1 and #2 (e.g., 110 on PUCCH resource 0). A fourteenth value or no transmission may indicate Triple-DTX. In this way, Option 8 may provide for efficient identification of poor TRP links when Single-DTX or Double-DTX occurs, thereby improving network resource allocation.

In some aspects, the UE 120 may provide 2-bit feedback in 4 PUCCH resources for 3 TRPs. In such a case, the UE 120 may use PUCCH format 0 or 1 in accordance with a format referred to herein as Option 8. A first value may indicate ACK without DTX (e.g., 11 on PUCCH resource 3). A second value may indicate a NACK without DTX (e.g., 00 on PUCCH resource 0). A third value may indicate ACK with Single-DTX-#0 (e.g., 00 on PUCCH resource 3). A fourth value may indicate ACK with Single-DTX-#1 (e.g., 01 on PUCCH resource 3). A fifth value may indicate ACK with Single-DTX-#2 (e.g., 10 on PUCCH resource 3). A sixth value may indicate ACK with Double-DTX-#0 and #1 (e.g., 00 on PUCCH resource 2). A seventh value may indicate ACK with Double-DTX-#0 and #2 (e.g., 01 on PUCCH resource 2). An eighth value may indicate ACK with Double-DTX-#1 and #2 (e.g., 10 on PUCCH resource 2). A ninth value may indicate NACK with Single-DTX-#0 (e.g., 00 on PUCCH resource 1). A tenth value may indicate NACK with Single-DTX-#1 (e.g., 01 on PUCCH resource 1). A tenth value may indicate NACK with Single-DTX-#2 (e.g., 10 on PUCCH resource 1). An eleventh value may indicate NACK with Double-DTX-#0 and #1 (e.g., 11 on PUCCH resource 1). A twelfth value may indicate NACK with Double-DTX-#0 and #2 (e.g., 01 on PUCCH resource 0). A thirteenth value may indicate NACK with Double-DTX-#1 and #2 (e.g., 10 on PUCCH resource 0). A fourteenth value or no transmission may indicate Triple-DTX. In this way, Option 9 may provide for efficient identification of poor TRP links when Single-DTX or Double-DTX occurs, thereby improving network resource allocation.

As shown by reference number 750, the UE 120 may receive a subsequent diversity enhancement based NC-JT communication. As shown by reference number 760, the subsequent diversity enhancement based NC-JT communication may be associated with a different MCS and/or a different TRP allocation than the diversity enhancement based NC-JT communication for which the feedback was provided. For example, a network may determine the different MCS and/or the different TRP allocation based at least in part on the feedback. In some aspects, the network may use a different TRP in place of a TRP for which a PUCCH was unsuccessfully decoded. Additionally, or alternatively, the network may increase an MCS of a TRP for which the PUCCH and the PDSCH were successfully decoded. Additionally, or alternatively, the network may decrease an MCS of a diversity enhancement based NC-JT communication. For example, when the network cannot identify which TRP provided the unsuccessfully decoded PDCCH, the network may decrease the MCS of each TRP associated with the subsequent diversity enhancement based NC-JT communication to improve a likelihood of successful reception of the subsequent diversity enhancement based NC-JT communication. In this way, the UE 120 and the network may improve network resource allocation by providing and utilizing feedback regarding PDCCHs and PDSCHs of diversity enhancement based NC-JT communications.

PUCCH format 0 may use a short PUCCH of 1 or 2 symbols with small UCI payloads of up to two bits with UE multiplexing capacity of up to 6 UEs with 1-bit payload in the same physical resource block (PRB). PUCCH format 1 may use a long PUCCH of 4 to 14 symbols with small UCI payloads of up to two bits with UE multiplexing capacity of up to 84 UEs without frequency hopping and 36 UEs with frequency hopping in the same PRB. PUCCH format 2 may use a short PUCCH of 1 or 2 symbols with large UCI payloads of more than two bits with no UE multiplexing capability in the same PRBs. PUCCH format 3 may use a long PUCCH of 4 to 14 symbols with large UCI payloads with no UE multiplexing capability in the same PRBs. PUCCH format 4 may use a long PUCCH of 4 to 14 symbols with moderate UCI payloads with multiplexing capacity of up to 4 UEs in the same PRBs.

As indicated above, FIGS. 7A and 7B are provided as examples. Other examples may differ from what is described with respect to FIGS. 7A and 7B.

Figure 8:
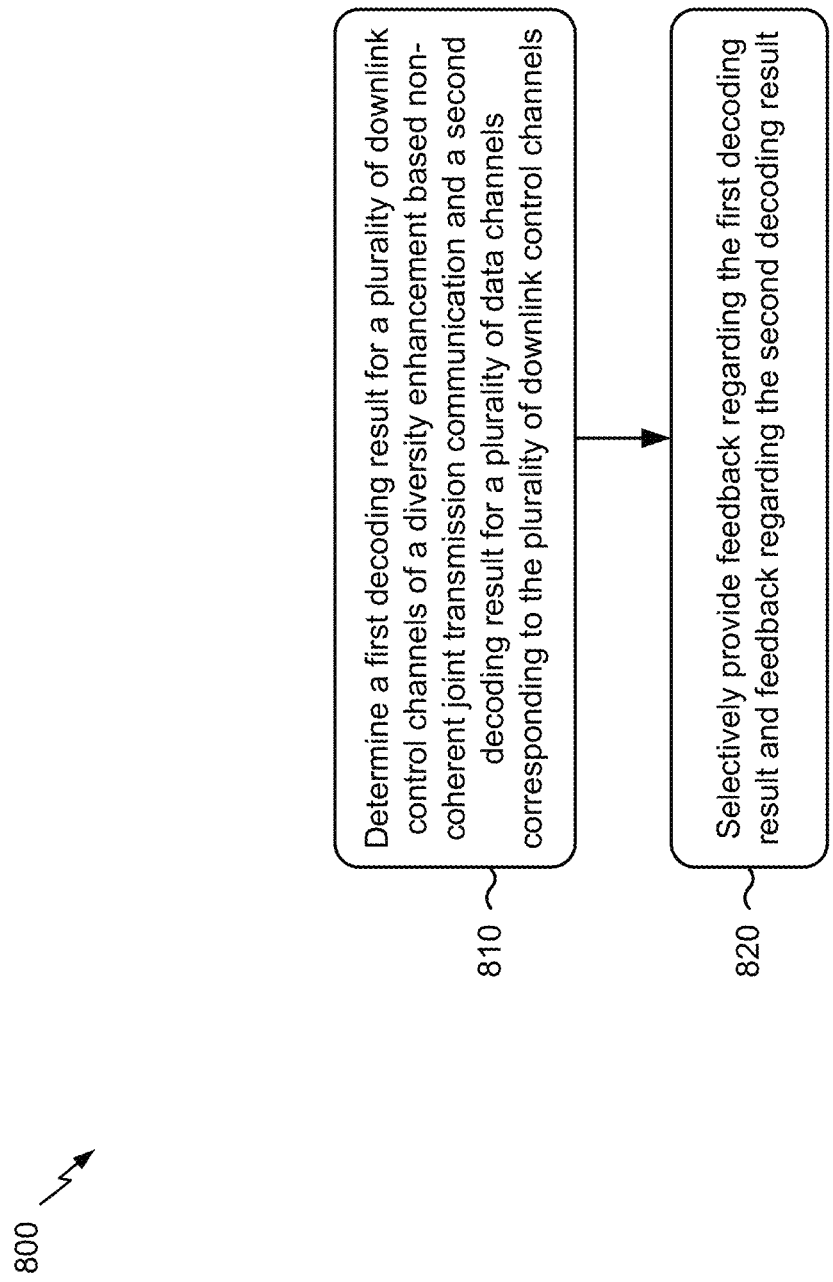
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs link quality feedback for a diversity enhancement based NC-JT communication.

As shown in FIG. 8, in some aspects, process 800 may include determining a first decoding result for a plurality of downlink control channels of a diversity enhancement based non-coherent joint transmission communication and a second decoding result for a plurality of data channels corresponding to the plurality of downlink control channels (block 810). For example, the UE (e.g., using controller/processor 280 and/or the like) may determine a first decoding result for a plurality of downlink control channels of a diversity enhancement based NC-JT communication. The UE may determine a second decoding result for a plurality of data channels corresponding to the plurality of downlink control channels.

As shown in FIG. 8, in some aspects, process 800 may include selectively providing feedback regarding the first decoding result and feedback regarding the second decoding result (block 820). For example, the UE (e.g., using controller/processor 280, transmit processor 264, TX MIMO processor 266, MOD 254, antenna 252, and/or the like) may selectively provide feedback regarding the first decoding result and feedback regarding the second decoding result. In some aspects, the UE may not provide feedback. For example, the UE may provide no transmission when a full DTX occurs (e.g., when no PDCCH is received). In some aspects, the network may receive the feedback, and may perform an action in accordance with the feedback, such as adding or dropping a TRP, retransmitting the diversity enhancement based NC-JT transmission, increasing or decreasing an MCS, or a combination of the above or other actions. In some aspects, the feedback regarding the first decoding result or the feedback regarding the second decoding result is associated with one or more particular transmission/reception points, and the one or more downlink control channels correspond to the one or more particular transmission/reception points. In some aspects, the feedback regarding the first decoding result indicates whether reception of one or more downlink control channels, of the plurality of downlink control channels, is successful, and the feedback regarding the second decoding result indicates whether decoding of a codeword of the plurality of data channels is successful.

Process 800 may include additional aspects, such as any single aspect or any combination of aspects described below and/or in connection with one or more other processes described elsewhere herein.

With respect to process 800, in a first aspect, respective signals received in each data channel, of the plurality of data channels, are generated from a redundant version of a common codeword. The UE may decode the common codeword based at least on one or more of the respective signals received from the plurality of data channels.

In a second aspect, alone or in combination with the first aspect, the feedback regarding the second decoding result indicates that decoding of a codeword associated with the plurality of data channels is successful, and the feedback regarding the first decoding result indicates that decoding of the plurality of downlink control channels is successful. In a third aspect, alone or in combination with any one or more of the first through second aspects, the feedback regarding the second decoding result indicates that decoding of a codeword associated with a proper subset of the plurality of data channels is successful, and the feedback regarding the first decoding result indicates that decoding of one or more particular downlink control channels, of the plurality of downlink control channels, is unsuccessful, wherein the one or more particular downlink control channels are a proper subset of the plurality of downlink channels.

In a fourth aspect, alone or in combination with any one or more of the first through third aspects, the feedback regarding the second decoding result indicates that decoding of a codeword associated with a proper subset of the plurality of data channels is successful, and the feedback regarding the PDCCH decoding result indicates that decoding of one or more of the plurality of downlink control channels is unsuccessful, wherein the one or more of the plurality of downlink control channels are a proper subset of the plurality of downlink channels. In a fifth aspect, alone or in combination with any one or more of the first through fourth aspects, the feedback regarding the second decoding result indicates that decoding of a codeword associated with the plurality of data channels is unsuccessful, and the feedback regarding the first decoding result indicates that decoding of the plurality of downlink control channels is successful.

In a sixth aspect, alone or in combination with any one or more of the first through fifth aspects, the feedback regarding the second decoding result indicates that decoding of a codeword associated with a proper subset of the plurality of data channels is unsuccessful, and the feedback regarding the first decoding result indicates that decoding of one or more particular downlink control channels, of the plurality of downlink control channels, is unsuccessful, wherein the one or more particular downlink control channels are a proper subset of the plurality of downlink control channels. In a seventh aspect, alone or in combination with any one or more of the first through sixth aspects, the feedback regarding the second decoding result indicates that decoding of a codeword associated with a proper subset of the plurality of data channels is unsuccessful, and the feedback regarding the first decoding result indicates that decoding of one or more downlink control channels, of the plurality of downlink control channels, is unsuccessful, wherein the one or more downlink control channels are a proper subset of the plurality of downlink control channels. In an eighth aspect, alone or in combination with any one or more of the first through seventh aspects, the feedback regarding the second decoding result indicates that decoding of plurality of downlink control channels is unsuccessful.

In a ninth aspect, alone or in combination with any one or more of the first through eighth aspects, the feedback regarding the first decoding result or the feedback regarding the second decoding result indicates one or more particular transmission/reception points, and the feedback regarding the first decoding result indicates whether reception of one or more downlink control channels, of the plurality of downlink control channels, corresponding to the one or more downlink control channels is successful, and the feedback regarding the second decoding result indicates whether decoding of a codeword of the plurality of data channels is successful.

In a tenth aspect, alone or in combination with any one or more of the first through ninth aspects, the feedback regarding the first decoding result and the feedback regarding the second decoding result are provided using a physical uplink control channel resource. In an eleventh aspect, alone or in combination with any one or more of the first through tenth aspects, the feedback regarding the first decoding result and the feedback regarding the second decoding result is provided using multiple physical uplink control channel resources.

In a twelfth aspect, alone or in combination with any one or more of the first through eleventh aspects, the diversity enhancement based non-coherent joint transmission communication is received from a plurality of transmission/reception points, a plurality of antenna panels, or a plurality of transmission/reception points and antenna panels, and the feedback regarding the first decoding result and the feedback regarding the second decoding result is for respective control channels or data channels of the plurality transmission/reception points, the plurality of antenna panels, or the plurality of transmission/reception points and antenna panels.

In a thirteenth aspect, alone or in combination with any one or more of the first through twelfth aspects, the feedback regarding the first decoding result and the feedback regarding the second decoding result is provided using a physical uplink control channel repetition scheme. In a fourteenth aspect, alone or in combination with any one or more of the first through thirteenth aspects, a particular value of at least one of the feedback regarding the first decoding result or the feedback regarding the second decoding result corresponds to two or more states of at least one of the first decoding result or the second decoding result. In a fifteenth aspect, alone or in combination with any one or more of the first through fourteenth aspects, the feedback regarding the first decoding result and the feedback regarding the second decoding result are provided together or as part of a single indicator. In a sixteenth aspect, alone or in combination with any one or more of the first through fifteenth aspects, the one or more particular transmission/reception points are identified by or associated with one or more respective demodulation reference signal (DMRS) groups. In a seventeenth aspect, alone or in combination with any one or more of the first through sixteenth aspects, the feedback regarding the first decoding result or the feedback regarding the second decoding result is associated with one or more particular transmission/reception points, and the one or more downlink control channels correspond to the one or more particular transmission/reception points.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network entity, in accordance with various aspects of the present disclosure. Example process 900 is an example where a network entity (e.g., BS 110, NG-CN 504, ANC 502, a CN, a gNB, and/or the like) performs configuration based at least in part on link quality feedback for a diversity enhancement based NC-JT communication.

As shown in FIG. 9, in some aspects, process 900 may include receiving feedback regarding a first decoding result, wherein the first decoding result is for a plurality of downlink control channels of a diversity enhancement based non-coherent joint transmission communication (block 910). For example, the network entity (e.g., using antenna 234, DEMOD 232, MIMO detector 236, receive processor 238, controller/processor 240, and/or the like) may receive feedback regarding a first decoding result. In some aspects, the first decoding result may be for a plurality of downlink control channels of a diversity enhancement based NC-JT communication. In some aspects, the network entity may determine the feedback. For example, the network entity may determine the feedback based at least in part on receiving no transmission (e.g., in a case wherein the feedback is defined as no transmission, such as for Double-DTX or Triple-DTX).

As shown in FIG. 9, in some aspects, process 900 may include receiving feedback regarding a second decoding result, wherein the second decoding result is for a plurality of data channels corresponding to the plurality of downlink control channels (block 920). For example, the network entity (e.g., using antenna 234, DEMOD 232, MIMO detector 236, receive processor 238, controller/processor 240, and/or the like) may receive feedback regarding a second decoding result. In some aspects, the second decoding result may be for a plurality of data channels corresponding to the plurality of downlink control channels. In some aspects, the network entity may determine the feedback. For example, the network entity may determine the feedback based at least in part on receiving no transmission (e.g., in a case wherein the feedback is defined as no transmission, such as for Double-DTX or Triple-DTX). In some aspects, the feedback regarding the first decoding result or the feedback regarding the second decoding result is associated with one or more particular transmission/reception points, and the one or more downlink control channels correspond to the one or more particular transmission/reception points. In some aspects, the feedback regarding the first decoding result indicates whether reception of one or more downlink control channels, of the plurality of downlink control channels, is successful, and the feedback regarding the second decoding result indicates whether decoding of a codeword of the plurality of data channels is successful.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
 determining a first decoding result for one or more downlink control channels of a plurality of downlink control channels,
  wherein the plurality of downlink control channels is associated with a communication of a diversity enhancement based non-coherent joint transmission, and wherein the plurality of downlink control channels corresponds to a plurality of transmission/reception points;

determining a second decoding result for one or more data channels of a plurality of data channels associated with the communication, wherein the plurality of data channels corresponds to the plurality of downlink control channels and corresponds to the plurality of transmission/reception points; and selectively providing a value indicating:

feedback regarding the first decoding result, the feedback regarding the first decoding result indicating at least a discontinuous transmission (DTX) associated with the communication, and feedback regarding the second decoding result, the feedback regarding the second decoding result indicating that the second decoding result associated with the communication is successful, wherein the feedback regarding the first decoding result or the feedback regarding the second decoding result is associated with one or more particular transmission/reception points of the plurality of transmission/reception points.

2. The method of claim 1, wherein respective signals received in each data channel, of the plurality of data channels, are generated from a redundant version of a common codeword, and wherein the method further comprises decoding the common codeword based at least in part on one or more of the respective signals received from the plurality of data channels.

3. The method of claim 1, wherein selective feedback of another value indicates feedback regarding the second decoding result, the selective feedback indicating that decoding of a codeword associated with the plurality of data channels is successful, and wherein the selective feedback of the other value indicates feedback regarding the first decoding result, the selective feedback indicating that decoding of the plurality of downlink control channels is successful.

4. The method of claim 1, wherein the feedback regarding the second decoding result indicates that decoding of a codeword associated with a proper subset of the plurality of data channels is successful, and wherein the one or more downlink control channels are one or more particular downlink control channels of the plurality of downlink control channels, wherein the one or more particular downlink control channels are a proper subset of the plurality of downlink control channels.

5. The method of claim 1, wherein the feedback regarding the second decoding result indicates that decoding of a codeword associated with a proper subset of the plurality of data channels is successful, and wherein the one or more downlink control channels are a proper subset of the plurality of downlink control channels.

6. The method of claim 1, wherein selective feedback of another value indicates feedback regarding the second decoding result, the selective feedback indicating that decoding of a codeword associated with the plurality of data channels is unsuccessful, and wherein the selective feedback of the other value indicates feedback regarding the first decoding result, the selective feedback indicating that decoding of the plurality of downlink control channels is successful.

7. The method of claim 1, wherein selective feedback of another value indicates feedback regarding the second decoding result, the selective feedback indicating that decoding of a codeword associated with a proper subset of the plurality of data channels is unsuccessful, and wherein the selective feedback of the other value indicates feedback regarding the first decoding result, the selective feedback indicating that decoding of one or more particular downlink control channels, of the plurality of downlink control channels, is unsuccessful, wherein the one or more particular downlink control channels are a proper subset of the plurality of downlink control channels.

8. The method of claim 1, wherein selective feedback of another value indicates feedback regarding the second decoding result, the selective feedback indicating that decoding of a codeword associated with a proper subset of the plurality of data channels is unsuccessful, and wherein the selective feedback of the other value indicates feedback regarding the first decoding result, the selective feedback indicating that decoding of the one or more downlink control channels is unsuccessful, wherein the one or more downlink control channels are a proper subset of the plurality of downlink control channels.

9. The method of claim 1, wherein the feedback regarding the second decoding result indicates that decoding of the plurality of downlink control channels is unsuccessful.

10. The method of claim 1, wherein the feedback regarding the first decoding result and the feedback regarding the second decoding result are provided using a physical uplink control channel resource.

11. The method of claim 1, wherein the feedback regarding the first decoding result and the feedback regarding the second decoding result are provided using multiple physical uplink control channel resources.

12. The method of claim 1, wherein the communication is received from the plurality of transmission/reception points, a plurality of antenna panels, or the plurality of transmission/reception points and the plurality of antenna panels, and wherein the feedback regarding the first decoding result and the feedback regarding the second decoding result is for respective control channels or data channels of the plurality of transmission/reception points, the plurality of antenna panels, or the plurality of transmission/reception points and the plurality of antenna panels.

13. The method of claim 1, wherein the feedback regarding the first decoding result and the feedback regarding the second decoding result are provided using a physical uplink control channel repetition scheme.

14. The method of claim 1, wherein a particular value of the value corresponds to two or more states of at least one of the first decoding result or the second decoding result.

15. The method of claim 1, wherein the feedback regarding the first decoding result and the feedback regarding the second decoding result are provided together or as part of a single indicator.

16. The method of claim 1, wherein the one or more particular transmission/reception points are identified by or associated with one or more respective demodulation reference signal (DMRS) groups.

17. A method of wireless communication performed by a network entity, comprising:

receiving a value indicating:

feedback regarding a first decoding result for one or more downlink control channels of a plurality of downlink control channels, wherein the plurality of downlink control channels is associated with a communication of a diversity enhancement based non-coherent joint transmission, wherein the plurality of downlink control channels corresponds to a plurality of transmission/reception points, and wherein the feedback regarding the first decoding result indicates at least a discontinuous transmission (DTX) associated with the communication, and feedback regarding a second decoding result for one or more data channels of a plurality of data channels associated with the communication, wherein the plurality of data channels corresponds to the plurality of downlink control channels and corresponds to the plurality of transmission/reception points, wherein the feedback regarding the second decoding result indicates that the second decoding result associated with the communication is successful, and wherein the feedback regarding the first decoding result or the feedback regarding the second decoding result is associated with one or more particular transmission/reception points of the plurality of transmission/reception points.

18. A user equipment for wireless communication, comprising:

one or more memories; and one or more processors, coupled to the one or more memories, configured to:

determine a first decoding result for one or more downlink control channels of a plurality of downlink control channels, wherein the plurality of downlink control channels is associated with a communication of a diversity enhancement based non-coherent joint transmission, and wherein the plurality of downlink control channels corresponds to a plurality of transmission/reception points;

determine a second decoding result for one or more data channels of a plurality of data channels associated with the communication, wherein the plurality of data channels corresponds to the plurality of downlink control channels and corresponds to the plurality of transmission/reception points; and selectively provide a value indicating:

feedback regarding the first decoding result, the feedback regarding the first decoding result indicating at least a discontinuous transmission (DTX) associated with the communication, and feedback regarding the second decoding result, the feedback regarding the second decoding result indicating that the second decoding result associated with the communication is successful, wherein the feedback regarding the first decoding result or the feedback regarding the second decoding result is associated with one or more particular transmission/reception points of the plurality of transmission/reception points.

19. The user equipment of claim 18, wherein respective signals received in each data channel, of the plurality of data channels, are generated from a redundant version of a common codeword, and wherein the one or more processors are further configured to decode the common codeword based at least in part on one or more of the respective signals received from the plurality of data channels.

20. The user equipment of claim 18, wherein selective feedback of another value indicates feedback regarding the second decoding result, the selective feedback indicating that decoding of a codeword associated with the plurality of data channels is successful, and wherein the selective feedback of the other value indicates feedback regarding the first decoding result, the selective feedback indicating that decoding of the plurality of downlink control channels is successful.

21. The user equipment of claim 18, wherein the feedback regarding the second decoding result indicates that decoding of a codeword associated with a proper subset of the plurality of data channels is successful, and wherein the one or more downlink control channels are one or more particular downlink control channels of the plurality of downlink control channels, wherein the one or more particular downlink control channels are a proper subset of the plurality of downlink control channels.

22. The user equipment of claim 18, wherein selective feedback of another value indicates feedback regarding the second decoding result, the selective feedback indicating that decoding of a codeword associated with the plurality of data channels is unsuccessful, and wherein the selective feedback of the other value indicates feedback regarding the first decoding result, the selective feedback indicating that decoding of the plurality of downlink control channels is successful.

23. The user equipment of claim 18, wherein selective feedback of another value indicates feedback regarding the second decoding result, the selective feedback indicating that decoding of a codeword associated with a proper subset of the plurality of data channels is unsuccessful, and wherein the selective feedback of the other value indicates feedback regarding the first decoding result, the selective feedback indicating that decoding of one or more particular downlink control channels, of the plurality of downlink control channels, is unsuccessful, wherein the one or more particular downlink control channels are a proper subset of the plurality of downlink control channels.

24. The user equipment of claim 18, wherein selective feedback of another value indicates feedback regarding the second decoding result, the selective feedback indicating that decoding of a codeword associated with a proper subset of the plurality of data channels is unsuccessful, and wherein the selective feedback of the other value indicates feedback regarding the first decoding result, the selective feedback indicating that decoding of the one or more downlink control channels is unsuccessful, wherein the one or more downlink control channels are a proper subset of the plurality of downlink control channels.

25. The user equipment of claim 18, wherein the feedback regarding the second decoding result indicates that decoding of the plurality of downlink control channels is unsuccessful.

26. The user equipment of claim 18, wherein the feedback regarding the first decoding result and the feedback regarding the second decoding result are provided using one or more physical uplink control channel resources.

27. The user equipment of claim 18, wherein the communication is received from the plurality of transmission/ reception points, a plurality of antenna panels, or the plurality of transmission/reception points and the plurality of antenna panels, and wherein the feedback regarding the first decoding result and the feedback regarding the second decoding result is for respective control channels or data channels of the plurality of transmission/reception points, the plurality of antenna panels, or the plurality of transmission/reception points and the plurality of antenna panels.

28. The user equipment of claim 18, wherein a particular value of the value corresponds to two or more states of at least one of the first decoding result or the second decoding result.

29. The user equipment of claim 18, wherein the one or more particular transmission/reception points are identified by or associated with one or more respective demodulation reference signal (DMRS) groups.

30. A network entity for wireless communication, comprising:
one or more memories; and
one or more processors, coupled to the one or more memories, configured to:
receive a value indicating:
feedback regarding a first decoding result for one or more downlink control channels of a plurality of downlink control channels,
wherein the plurality of downlink control channels is associated with a communication of a diversity enhancement based non-coherent joint transmission,
wherein the plurality of downlink control channels corresponds to a plurality of transmission/reception points, and
wherein the feedback regarding the first decoding result indicates at least a discontinuous transmission (DTX) associated with the communication, and
feedback regarding a second decoding result for one or more data channels of a plurality of data channels associated with the communication,
wherein the plurality of data channels corresponds to the plurality of downlink control channels and corresponds to the plurality of transmission/reception points,
wherein the feedback regarding the second decoding result indicates that the second decoding result associated with the communication is successful, and
wherein the feedback regarding the first decoding result or the feedback regarding the second decoding result is associated with one or more particular transmission/reception points of the plurality of transmission/reception points.

* * * * *